Feb. 25, 1969 R. G. LEE 3,429,445
SELF-CLEANING FILTER
Original Filed Nov. 14, 1966 Sheet 2 of 3

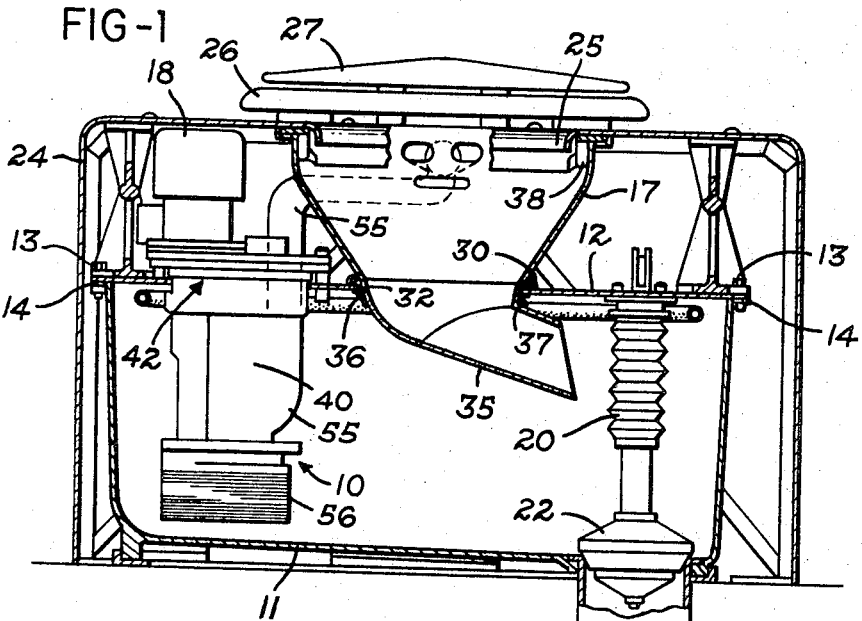

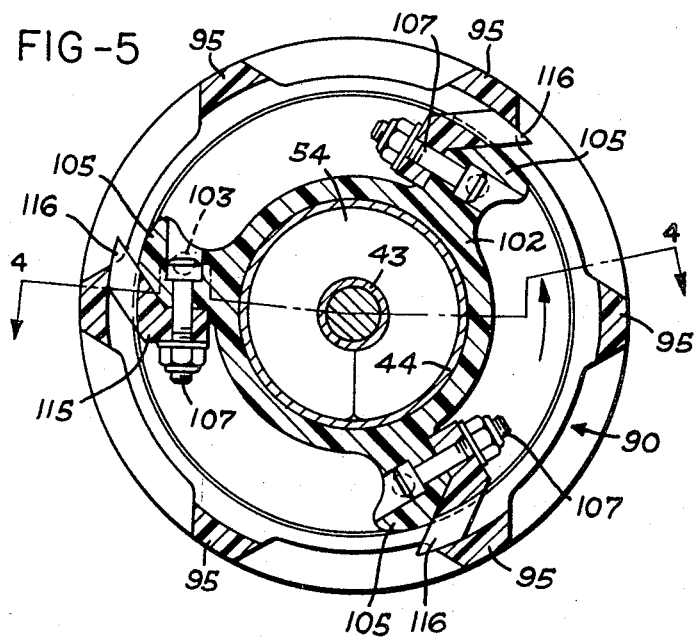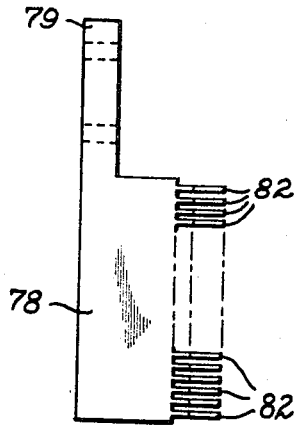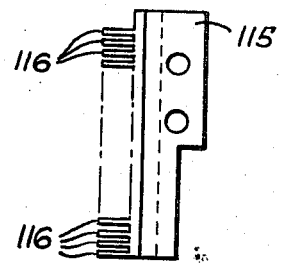

United States Patent Office 3,429,445
Patented Feb. 25, 1969

3,429,445
SELF-CLEANING FILTER
Robert G. Lee, Dayton, Ohio, assignor to Koehler-Dayton, Inc., Dayton, Ohio, a corporation of Ohio
Continuation of application Ser. No. 593,844, Nov. 14, 1966. This application Dec. 1, 1967, Ser. No. 687,907
U.S. Cl. 210—357        3 Claims
Int. Cl. B01d 33/00

ABSTRACT OF THE DISCLOSURE

An improved filter for use in a self-contained sewerage system for separating the various solids from the flushing liquid. The filter is made of a cup-shaped plastic member having radial filtering slots cut in the side walls of the member except in the area of the axial ribs which hold the filter together. A cleaning comb having a plurality of parallel teeth is mounted adjacent the filter so that the teeth extend through said slots to maintain the slots open when the comb is moved relative to the slots. The comb may be mounted on the inside or outside of the walls, and either the comb or the side walls rotated.

---

This invention relates to improved filtering devices, particularly filtering devices adapted for use with recirculating sewerage systems or the like, and is a continuation of abandoned application Ser. No. 593,844 filed Nov. 14, 1966, which in turn is a continuation-in-part of application Ser. No. 479,093, filed Aug. 12, 1965, now U.S. Patent No. 3,342,341 and assigned to the same assignee as this application, now U.S. Patent No. 3,342,341, issued Sept. 19, 1967.

The invention relates to a self-cleaning filtering device which is particularly useful in connection with corrosive liquids, and in situations where various solids, including paper, plastic, etc. may be contained in the liquid to be filtered. For example, self-contained sewerage systems, such as disclosed in U.S. Patent No. 3,067,433, require such a filter to provide an adequate recirculating flow of liquid for flushing the toilet bowl. Particularly where the systems are designed for installation in vehicles, such as aircraft or buses, it is desirable to have an efficient filter arrangement which is relatively inexpensive, lightweight, and easily serviced.

The present invention provides such a filtering device wherein the filtering structure can readily be formed simply by molding and machine operations from a minimum of parts, and of inert plastic materials which are not subject to corrosion, and it may have self-lubricating provisions to minimize wear during use.

Filters of the general type to which the present invention is directed are shown in said U.S. Patent No. 3,067,433. The prior filter devices, however, are constructed of a relatively large number of parts which are clamped together in an assembly by suitable bolts or the like. The aforementioned patent application, Ser. No. 479,093, discloses an improved form of such filter, and also discloses that the individual filter rings and blades or teeth can be constructed of suitable synthetic materials. Also, it is obvious that it is possible to mold the filter body assembly as an integral part, instead of assembling it from individual rings and spacers.

In order to provide for withdrawal of the molded body from the mold, it is necessary that the filter passages have tapered or chamfered surfaces, and these surfaces are not effective in cooperating with the teeth or blades of the cleaning comb, since any separation of the body and comb results in an increase in the spacing between the teeth of the comb and the surfaces defining the filtering passages or slots in the filter body.

Accordingly, the present invention has for its primary object the provision of a self-cleaning filter arrangement in which the filter passages are cut or similarly machined into an integral filter body member, thereby effectively separating this body member into a plurality of integrally attached ring-like members having cooperative wall surfaces which define the slots cut into the filter body, and which surfaces are parallel substantially through the thickness of the wall of the filter body member. These ring-like portions of the machined body member remain connected by ribs which are formed as an integral part, extending from either the inner or the outer surface of the cylindrical body member, depending upon whether the cleaning comb construction is to be mounted in the interior or exterior of the body member, the arrangement being such that the ribs are on the opposite surface from that to which the comb is adjacent, in order to avoid interference when there is relative movement between the comb and the body member to sweep the teeth of the comb through the filtering passages of the slots. One or more comb members may also be formed according to the invention as an integral piece with projecting teeth, or in some cases the comb may be made up of an assembly of individual blades, with or without spacers, and the cleaning motion can be obtained either by rotation of the comb or rotation of the filter. Preferably, a pump inlet structure is located within the body member of the filter, and the remainder of the body member is enclosed about the inlet structure of the pump, such that effectively all of the liquid passing through the filter enters the interior of the body member through the slot-like filtering passages.

Other objects and advantages of the invention will be apparent from the following description, the accompanying drawings and the appended claims.

In the drawings—

FIG. 1 is a vertical sectional view taken through a typical self-contained sewerage system embodying the improved filtering construction provided by the invention;

FIG. 2 is an enlarged sectional view taken on line 2—2 of FIG. 3, showing one form of the improved filter according to the invention, wherein the cleaning comb member is mounted in a stationary position on the interior of the filter body member, and the body member is arranged to rotate relative to the comb;

FIG. 5 is a sectional view taken along line 5—5 on FIG. 4; and

FIGS. 6 and 7 are detailed views of integral comb members which may be used with the different forms of body members shown in FIGS. 2 and 4, respectively.

Figure 3:
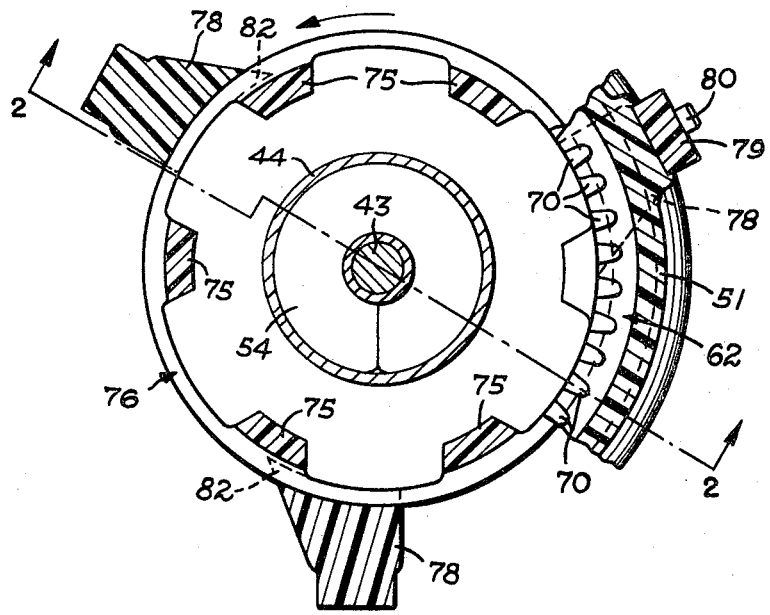
FIG. 3 is a sectional view taken on line 3—3 in FIG. 2.

Referring to the drawings, which illustrate a preferred embodiment of the invention, FIG. 1 illustrates the filter-pump assembly 10 in accordance with the invention. This assembly is shown and described in connection with a self-contained sewerage system of the type disclosed in U.S. Patent No. 3,067,433 since it is particularly suited for use in such sewerage systems. The system includes a tank 11 with its open top normally closed by a cover 12 secured in position by a number of conventional bolt and nut fasteners 13 which extend through peripheral openings in the cover 12 and flanges 14 of the tank.

The cover 12 is designed to support substantially all of the operating components of the system so that they may easily be removed for maintenance purposes. The flush bowl 17, the pump-filter assembly 10, the drive motor 18, the drainage actuator tube 20 and its valve head 22 are secured in one manner or another to the cover 12. A casing or shroud 24 is mounted on the tank 11 and the upper portion of the flush bowl 17, enclosing the operating components of the system. An opening 25 in the casing 24 is positioned immediately above the bowl 17, and the seat 26 and its cover 27, as shown in FIG. 1, are pivotally mounted thereabove on the casing 24 to form a complete enclosure.

The flush bowl 17 has a flange 30 secured around its lower edge and a portion of the flange 30 extends horizontally therefrom to engage the cover 12 around the periphery of an aperture 32, to support the flush bowl 17 on the cover 12. A spout 35 is pivotally connected to the flange 30 by a hinge 36 to permit movement of the spout 35 between a normal position, as shown by the solid lines of FIG. 1, where waste material in the bowl 17 is flushed through the spout 35 into the tank 11 at a point spaced laterally from directly below the bowl. In this position the contents of the tank 11 are not visible through the flush bowl 17 and the liquid in the tank will not be splashed into the bowl. When power fails or the motor 18 is inoperative, the spout 35 can be manually pivoted to an inactive position wherein waste material can drop directly from the bowl 16 into the tank 11 without flushing it through the spout. To hold the spout 35 in its normal position, the flexible pressure clasps 37 are secured to the spout at spaced intervals around the upper periphery thereof, and will release the spout when downward pressure is applied thereto. Reference is made to the U.S. patent of Herkenhine et al. No. 3,172,131 granted Mar. 9, 1965, and assigned to the assignee of this invention for further details.

In the operation of the system, the filter-pump assembly 10 draws fluid from tank 11 and pumps it into the manifold 38 around the upper periphery of bowl 17, from which it flows through a plurality of openings in the manifold along the inside of the bowl 17 in a swirling manner to wash the contents of the bowl 17 through the spout 35 and into the tank 11.

The pump-filter assembly 10 includes a housing 40 which is removably secured to the cover 12. The electric motor 18 is mounted on the top surface of this housing for driving the gear reduction unit 42 which has a first output in the form of the elongated drive shaft 43 rotatably mounted in the downwardly extending support tube 44 on sealed ball bearings 45. A dynamic seal assembly 48 is provided between the flange 49 on the shaft 43 and the support member 51 within the tube 44. Immediately below the support member 51 is the pump outlet passage 53 which receives the liquid from the interior of the filter. The impeller 54 is fixed on the end of the shaft 43 and is rotated by it, and its inlet is below within the filter. The conduit 55 leads to the manifold 38 around the flush bowl 17 so that, when the impeller 54 is being rotated, fluid is drawn from the tank 11 through the filter 56, and flows upwardly through the conduit 55 to the manifold 38.

One preferred embodiment of the filter construction is shown in FIGS. 2 and 3. Here, the body of the filter is constructed and mounted for rotation, and the cleaning fingers are mounted in a stationary position to sweep the filter passages as the filter body rotates. Specifically, the lower end of the support member 51 has an internal cylindrical surface 60 which receives the upper end of the integral filter body member 62. This body member preferably is molded or similarly formed as a generally cup-shaped unit, from a suitable corrosion resistant synthetic material such as nylon or equivalent. A satisfactory material which has actually been used is a type known commercially as Delrin. A shoulder 63 is formed at the upper end of the body 62, and a retaining ring 65 holds the filter body in the support member 51, being attached thereto by a number of retaining screws 66. Sufficient clearance is provided to permit the filter body 62 to rotate within the lower end of the support member 51.

As shown particularly in FIG. 2, the lower end of the filter body surrounds the lower end of the tube 44, which in turn surrounds the impeller 54 and provides its inlet. The lower edge of tube 44 is spaced a substantial distance above the bottom of the bottom 62 in order to provide adequate flow area for the filtered liquid being drawn into the impeller.

At the upper end of the filter body there are internal gear teeth 70 (see also FIG. 3) which preferably are molded into the body, and which are adapted to mesh with a drive pinion 72. This pinion is carried on the end of a shaft 73 extending from the gear reduction unit 42, and preferably rotates at a substantially slower speed than the impeller drive shaft 43. An O-ring 74 seals the housing surrounding shaft 73 from the interior of the filter. Thus, whenever the impeller is operating the pinion 72 rotates and in turn rotates the filter body.

The body 62 includes a plurality of internal ribs 75, which can be seen both in FIG. 2 and in FIG. 3. The filter passages 76 are formed as a series of inwardly extending slots through the walls of the filter body, and the opposing surfaces of these slots are formed as generally parallel surfaces throughout the width of the walls of the body member. The slots preferably are formed by machining (i.e., milling or cutting) through the wall thickness of the integral plastic body member, forming the desirable generally parallel opposed surfaces which define the filtering passages 76. As seen particularly in FIG. 3, these passages are interrupted by the ribs 75, thus the integral nature of the filter body member is retained. Furthermore, the filter body is thus readily and inexpensively formed as a simple and easily replaceable unit, reducing maintenance and repair costs.

The cleaning device for the filter includes a plurality of comb members 78 which have an upwardly extending portion 79 adapted to be fastened to the exterior of the support member 51 by suitable bolts 80. The major and lower portions of the comb members are provided with a plurality of teeth 82 dimensioned to fit snugly within the filtering passages 76. Preferably, but not necessarily, the comb members 78 are likewise molded or cast of a synthetic plastic material, and the teeth 82 are formed by machining slots into one surface of the comb member. These teeth preferably are slanted forward and extend somewhat arcuately, as best seen in FIG. 3, to project through substantially the entire extent of the filtering passages 76, and toward the direction of rotation of the filter body 62, as indicated by the arrow in FIG. 3.

In a suitable form there are three comb members 78 spaced around the filter body, as shown in FIG. 3, and each of these comb members is readily replaced simply by withdrawing the bolts 80. If desired, it is also possible to use comb members which are built up in the conventional way by stacking individual metallic or plastic comb pieces. In either event the comb member can readily and quickly be removed for servicing or replacement.

Figure 4:
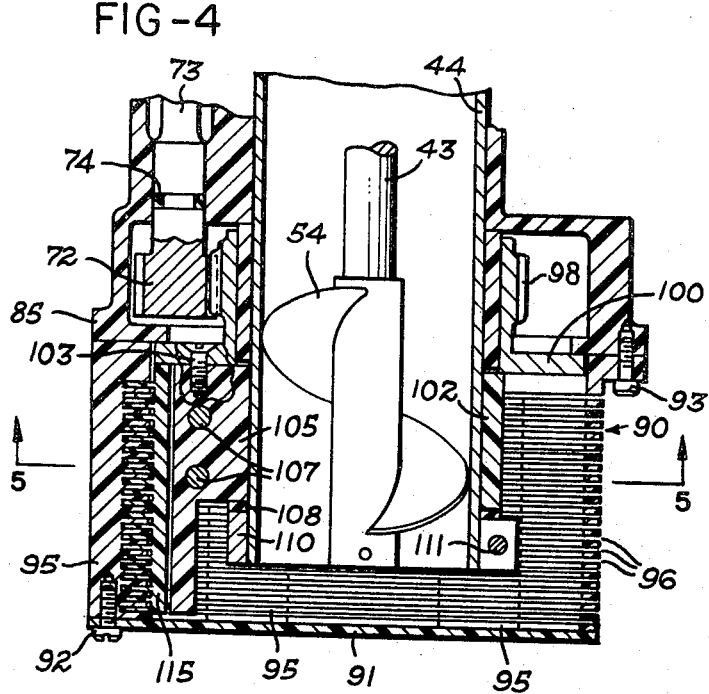
FIG. 4 is a view similar to FIG. 2, taken on line 4—4 of FIG. 5, illustrating a modified form of the invention wherein the comb members are arranged to rotate within the integral body member, and the body member is mounted to be stationary.

Another embodiment of the invention is shown in FIGS. 4, 5, and 7, wherein the comb members are mounted to rotate, and are located internally of the filter body member, being mounted to rotate while the filter body is mounted in a stationary position. Parts which are identical to those shown in FIGS. 2 and 3 are designated with the same reference numerals. The housing includes a lower flange 85 to which is bolted the modified filter body member 90. In this case the filter body may be formed either as an integral cup-shaped unit, or it may have a separable bottom 91 attached by bolts 92 to the remainder of the body. Similar bolts 93 extend through a flange in the filter body and into the flange 85, thereby holding the filter body in a stationary position on the bottom of the housing, surrounding the impeller 54 and the inlet of its tube 44.

The filter body in this instance also is provided with a plurality of ribs 95, formed on the exterior of the filter body member as shown particularly in FIG. 5. The filtering passages 96 are cut through the sides of the body 90 and extend only partially into the ribs, as seen in FIG. 5, whereby the ribs maintain the integral nature of the filter body, and again the filtering passages are machined to have generally parallel and opposed surfaces through the thickness of the walls of the filter body 90.

The pinion 72 in this case meshes with a gear 98 having a lower flange 100 that fits under the flange 85 of the housing. A comb carrier 102 is fastened to the bottom of the flange 100 by a plurality of machine screws, one of which is indicated at 103 in FIG. 4. The carrier includes a plurality of outwardly extending arm portions 105 that receive bolt and nut fasteners 107. The carrier in turn rests upon a suitable washer 108 which is supported by a clamp ring 110 secured to the bottom of the tube 44 by tightening its clamping bolt 111.

The fasteners 107 extend through suitable holes in the body of comb members 115, one of which is shown separately in FIG. 7. These comb members, as in the case of the comb members 78, preferably are formed of an integral piece of synthetic plastic material, or other suitable corrosion resistant material, and a plurality of teeth 116 are formed in the extended edge of the comb members by machining the edge of the comb body to produce parallel tooth surfaces which are fitted closely with the surfaces defining the filtering passages 96.

As shown in FIG. 5, the teeth 116 preferably extend through the filtering passages of the filter body and are raked or slanted rearward with respect to the direction of rotation of the member 102, as indicated by the arrow in FIG. 5.

From the foregoing specification, it is seen that the present invention provides a novel and relatively inexpensive self-cleaning filter construction which embodies an integrally molded filter body and integrally molded cleaning comb members. It is considered within the scope of the invention to employ either of these parts as integrally formed members with the other being formed of stacked individual parts, preferably coated with or made of a suitable plastic material such as Teflon or nylon, which has desirable corrosion resistant properties. In either event, the integrally molded parts for the filter passages, or comb teeth, are formed precisely with parallel surfaces to assure that the spacing between the comb teeth and the walls of the filter passages remain the same regardless of slight misalignments in assembly or due to forces exerted on the parts during operation.

What is claimed is:

1. A power operated filter device for use in a self-contained recirculating sewerage system for filtering the inlet flow to a motor-operated pump, said system incorporating a tank and a downwardly extending support tube having a liquid passage therein which defines at its lower end a normally immersed inlet to the pump; said filter device comprising a support member surrounding the lower end of said tube, a cup-shaped body of moldable corrosion resistant synthetic material mounted on said body and extending around and below the lower end of said tube, said body having one surface thereof formed as a cylindrical surface and a plurality of connecting ribs extending radially from the opposite surface of said body, said body incorporating a bottom wall extending across and below the lower end of said tube whereby the body completely surrounds the lower end of said tube such that all flow into said tube must pass through said body, said body also incorporating a plurality of ring portions integral with said ribs and extending radially therefrom, said ring portions having flat parallel wall surfaces defining a plurality of radially extending slots cut through the walls of said body about its entire periphery and extending from said one surface to said opposite surface and terminating at said ribs in the region of the joints between said ribs and said opposite surface whereby said ribs maintain the integrity of the slotted body, said slots being of sufficiently small width to filter particles of any appreciable size from the liquid flowing through said slots, at least one cleaning comb member mounted adjacent said one surface of said body, said comb member having a vertically extending support portion and a plurality of individual teeth extending from said support portion into said slots, said teeth having a cleaning edge on the leading edge portion thereof slanted in a direction to force particles in said slots toward the exterior of said body during relative movement between said body and said comb member, said teeth having flat parallel surfaces and being dimensioned to fit snugly within said slots whereby the flat surfaces of said teeth engage the flat radially extending surfaces of said slots, and drive means connected to effect relative movement between said body and said comb member during operation of the pump.

2. A filter device as defined in claim 1 wherein said ribs extend from the interior wall surface of said body and said comb means is mounted adjacent to said outer surface of said body, and said means for causing relative movement being connected to rotate said body relative to said comb means.

3. A filter device as defined in claim 1 wherein said ribs extend from the outer wall of said body, and said comb means is mounted within the said body and adjacent to the interior wall surface thereof with said teeth projecting outwardly through said filtering passages, and said means for causing relative movement being connected to rotate said comb means about the interior of said body.

References Cited

UNITED STATES PATENTS

| 1,852,873 | 4/1932 | Berger | 210—357 X |
| 1,938,934 | 12/1933 | Scott | 210—357 |
| 2,314,477 | 3/1943 | Bodey | 210—497 X |
| 2,453,622 | 11/1948 | English | 210—357 X |
| 3,067,433 | 12/1962 | Dietz et al. | 210—357 X |
| 3,219,193 | 11/1965 | Techler | 210—497.1 |
| 3,343,178 | 9/1967 | Palmer | 4—115 |
| 3,356,221 | 12/1967 | Katona et al. | 210—416 X |

FOREIGN PATENTS

| 682,587 | 10/1939 | Germany. |
| 505,553 | 5/1939 | Great Britain. |

SAMIH N. ZAHARNA, *Primary Examiner.*

J. L. DE CESARE, *Assistant Examiner.*

U.S. Cl. X.R.

210—360, 415, 416